Nov. 28, 1961  W. E. FOLKERTS  3,010,436
POWER STEERING SYSTEM
Filed Dec. 31, 1958  3 Sheets-Sheet 1

INVENTOR.
Walter E. Folkerts.
BY Harness & Harris
ATTORNEYS.

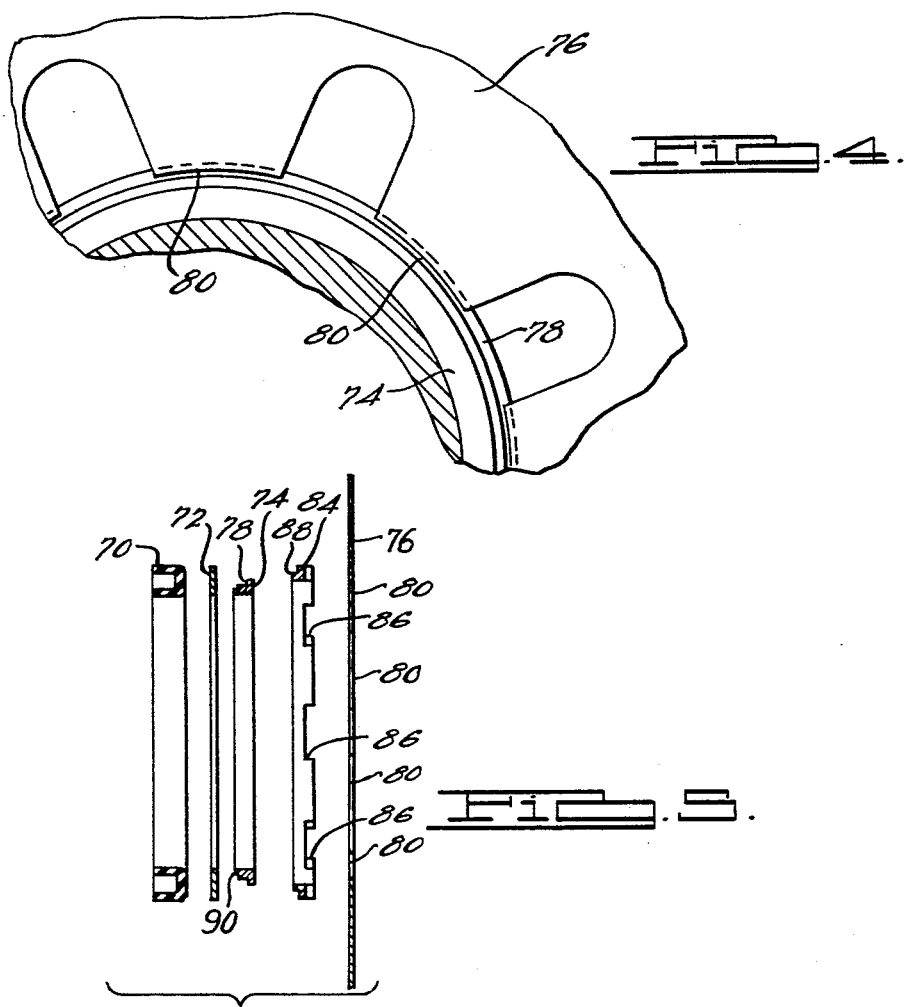
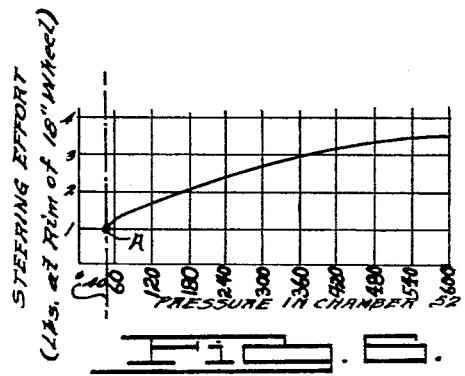

United States Patent Office 3,010,436
Patented Nov. 28, 1961

3,010,436
POWER STEERING SYSTEM
Walter E. Folkerts, Hazel Park, Mich., assignor to Chrysler Corporation, Highland Park, Mich., a corporation of Delaware
Filed Dec. 31, 1958, Ser. No. 784,312
14 Claims. (Cl. 121—41)

This invention relates to power steering systems for use in vehicles such as automotive conveyances, and relates in particular to a novel type of steering resistance developing mechanism for use in these systems for imparting normal road steering resistance feel to the manually operated steering wheel of the vehicle.

In power steering systems of the type conventionally used on automobiles a pressure cylinder is provided having a fluid pressure responsive piston therein operatively linked on one side to the steering column and on the other side to the front wheels of the vehicle. A source of pressurized fluid such as a fluid accumulator fed by a fluid pressure pump supplies fluid under pressure to a flow control valve which is also linked to the steering column and which reacts to selective movement thereof to allow fluid to flow into the cylinder selectively on each side of the piston and discharge selectively from each side thereof to cause movement of the piston and the wheels linked thereto.

These systems have been provided with various types of steering resistance means some of which communicate with the pressure cylinders thereof and are pressure responsive for imitating normal road friction steering resistance pressure. These means have not proven entirely satisfactory in that the artificial steering resistance pressure developed thereby and felt by the operator through the steering wheel steadily increases to an undesirable level during steering conditions such as parking which cause very high pressures to develop in the pressure cylinders of these power steering systems.

It is therefore a major object of this invention to provide a steering resistance pressure developing means which is pressure responsive and which in response to turning of the steering wheel an initial degree rapidly develops a resistance pressure of a desirable magnitude and then increases said pressure in response to further turning of the steering wheel only a slight amount regardless of the actual road resistance to the steering.

A specific object is to provide a power steering system with a keel over steering pressure reaction member communicating with and responsive to power steering pressure to develop steering resistance pressure, and with a resistance pressure modifying member for acting against said reaction member at predetermined power steering pressure to modify said steering resistance pressure upon further turning of the steering wheel against frictional resistance.

Another object is to provide power steering systems having the aforesaid steering resistance pressure modifying means with a novel type of power steering valve centering means.

Further objects and advantages will become apparent from the following description and drawings, in which:

FIGURE 4 represents an enlarged plan view of a valve centering spring assembly used in conjunction with the present reaction means;

FIGURE 5 represents cross sectional views of the separate elements comprising the reaction and valve centering means and centering assembly; and FIGURE 6 represents graphically the relationship of required steering force and required effort of the operator to create this force.

Figure 1:
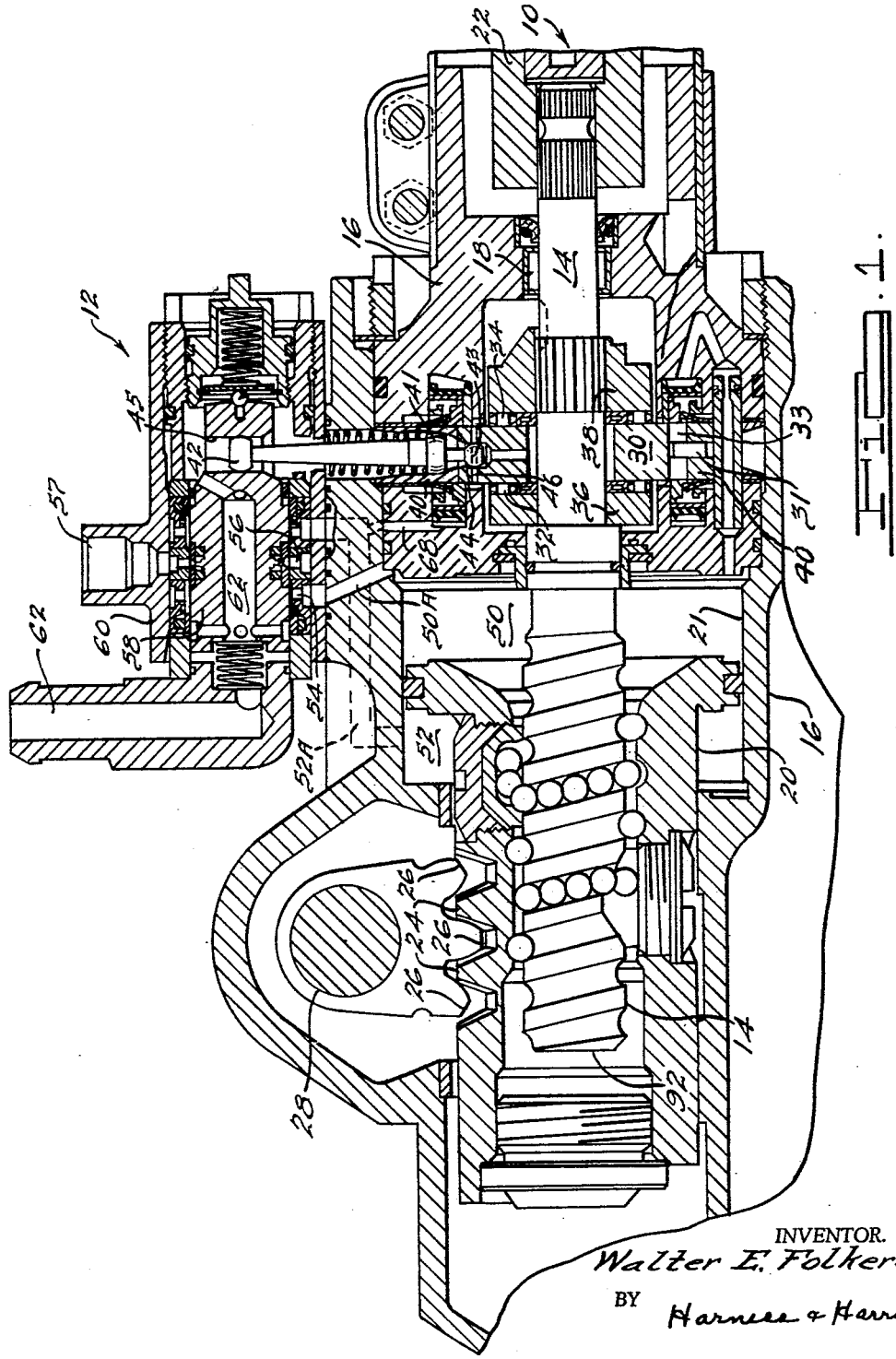
FIGURE 1 represents a longitudinal mid-sectional view of a power steering unit embodying the present invention.

Referring to FIGURE 1 of the drawings, the power steering unit comprises a power steering worm assembly 10 and a power steering valve 12. The worm assembly 10 consists of a worm shaft 14 journaled in housing 16 at one end by needle bearing 18 and journaled at its other end in piston 20 slidably mounted in fluid cylinder 21 formed in housing 16. Coupling 22 splined to shaft 14 is adapted for connection to the steering column of a vehicle to cause shaft 14 to rotate in response to movement of the steering wheel. Teeth 24 on piston 20 mesh with teeth 26 on a steering tie rod 28, whereby movement of the piston in the cylinder 21 caused by rotation of shaft 14 will rotate rod 28 and effect steering movement of the vehicle wheels which are connected thereto.

Figure 2:
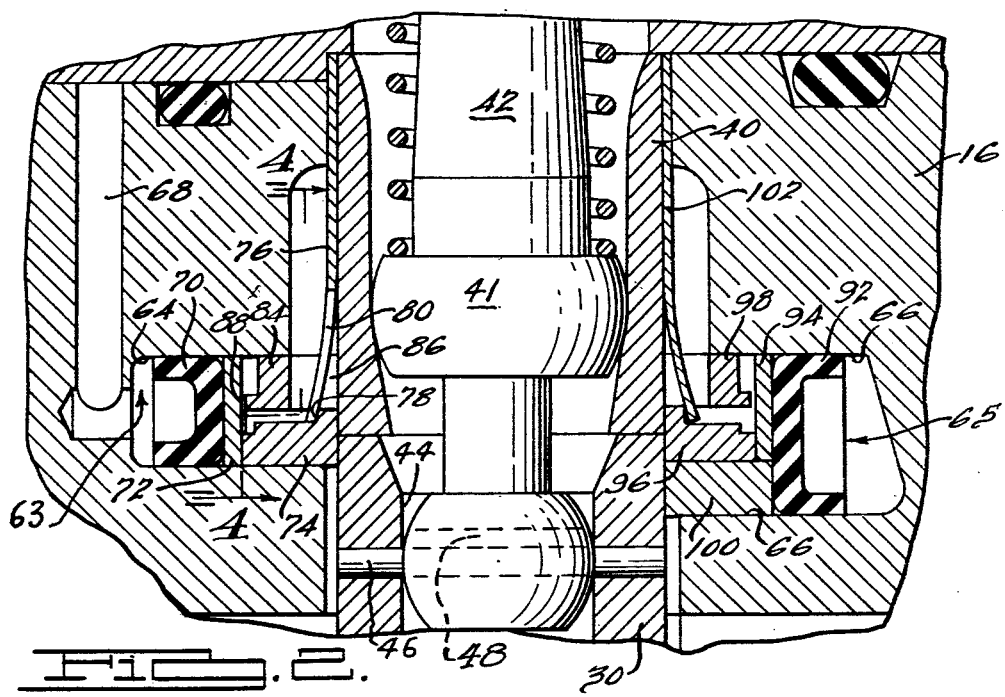
FIGURE 2 represents an enlarged sectional view of the power steering reaction means of FIGURE 1 in a closed or dead center position.
Figure 3:
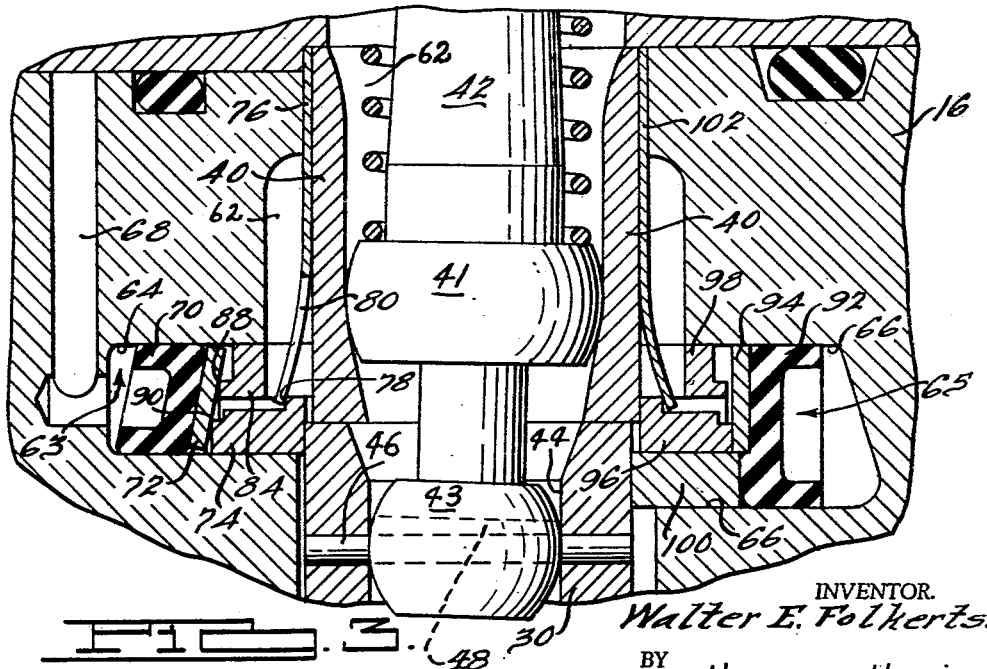
FIGURE 3 represents an enlarged sectional view of the reaction means of FIGURE 2 in a working reaction position.

An annular thrust member or valve actuating means 30 is rotatably mounted on worm shaft 14 by bearings 32 and 34 and lock collets 36 and 38. An annular stationary member 40 surrounding and slidably receiving thrust member 30 pivotally receives bearing portion 41 of a valve actuating post 42. Pin 31 secured in member 40 is slidably received in slot 33 in member 30 and prevents relative rotation of these members while allowing relative longitudinal or axial motion thereof. A stem portion 43 of post 42 projects into a cavity 44 in thrust member 30 and is prevented from rotating therein by means of a pin 46 secured in member 30 and extending through slot 48 in portion 43 and frictionally but movably engaging the sides of said slot 48 to allow rocking motion of post 42 in a clockwise or counterclockwise direction as shown in FIGURES 1, 2, and 3. Movement of shaft 14 either to the right or to the left in FIGURE 1 by threading the same in or out of piston 20 will also cause thrust member 30 to move slightly and exert a force on portion 43 of post 42 tending to rock said post about bearing portion 41 for actuating the power steering valve described below.

Referring further to FIGURE 1, fluid chambers 50 and 52 are connected to working ports 54 and 56 respectively of valve 12 through passages 50A and 52A respectively. These working ports are selectively opened to the fluid inlet 57 by movement of actuating post 42 into contact with the sides of aperture 45 in valve core 58, which contact moves the valve core 58 relative to the valve body 60. Simultaneously with the selective opening of either one of the working ports to inlet 57, the other working port is opened to the low pressure fluid discharge passage generally indicated as 62 to create thereby a pressure drop across the piston 20 in a selected direction and cause said piston to move toward the chamber of lower pressure. This movement of piston 20 reduces the turning force on the worm shaft 14 necessary to cause relative movement of the piston and shaft, and necessary to rotate the tie rod 28 to turn the wheels connected thereto for steering of the vehicle. Valve 12 is more completely described in copending application of Walter E. Folkerts, Serial No. 784,366 filed December 31, 1958, now Patent No. 2,973,747 issued on March 7, 1961.

Referring to FIGURE 2, pressure responsive power steering reaction means 63 and 65 are shown comprising respectively annular recesses 64 and 66 in housing 16 encircling shaft 14 on opposite axial ends of thrust member 30 and stationary member 40. Recess 64 connects with passage 52A through passage 68 and is maintained under the same fluid pressure as exists in chamber 52. This pressure is transmitted to thrust member 30, when it is moved from its dead center position shown in FIGURE 2 to a steering position such as is shown in FIGURE 3 by means of a ring-shaped seal 70, a reaction pressure diminishing or keel over ring 72, and a reaction force transmitting ring 74, all of which are axially movable in cavity 64 and are stopped by member 40 when they are moved to the aforesaid dead center position. Member 74 is constantly urged to the dead center or straight ahead steering position by spring member 76 which helps to insure the proper positioning of thrust member 30, actuating arm 42, and valve core 58 when it is desired to steer the vehicle straight ahead.

Referring to FIGURE 5, seal 70 of resilient rubber-like material has a U or cup-shaped cross section which allows the sides thereof to be forced into sealing engagement with the sides of cavity 64 by the fluid pressure transmitted into cavity 64. Keel over ring 72 is shaped like a flat washer and is made of resilient material such as spring steel so that it will be able to keel over or flex out of its flat plane as shown in FIGURE 3. Force transmitting ring 74 is provided with a shoulder 78 for engaging the fingers 80 of the annular valve centering spring 76 (see FIGURE 4) which urges ring 74 toward members 30 and 40 to aid in centering the valve core 58 as aforesaid.

Referring further to FIGURES 2, 3 and 5, a reaction force modifying or load carrying annular ring 84 is frictionally fixed in cavity 64 and abuts stationary member 40. Ring 84 is provided with slots 86 (see FIGURE 5) to accommodate fingers 80 of spring 76. A shoulder 88 on ring 84 is spaced slightly from ring 72 when member 30 is at its dead center position shown in FIGURE 2. This shoulder 88 however provided a means to relieve ring member 74 and member 30 of a portion of the pressure on seal 70 and ring 72 when member 30 moves ring member 74 and ring 72 far enough to the left and pivots arm 42 sufficiently clockwise to cause the pressure in chamber 52 and cavity 64 to be built up and exert a force on ring 72 sufficient to cock it out of its plane around shoulder 90 on member 74.

It is particularly shown in the graph of FIGURE 6 that the effort or force required to manually turn the steering wheel and move member 30 to the left increases rapidly until a point A on the Chamber Pressure vs. Steering Effort curve is reached, which point represents a predetermined pressure in chamber 52 and cavity 64. When this pressure is attained, ring 72 will have keeled over or cocked over sufficiently to allow shoulder 88 on ring 84 to assume a large portion of the steering reaction pressure load which will develop upon further movement of member 30 to the left in FIGURE 3.

Located in recess 66 in housing 16 at the axial end of thrust member 30 opposite to reaction means 63 described above is the directionally oppositely acting reaction means 65 comprising seal 92, keel over ring 94, force transmitting ring member 96, centering spring 102, and force modifying means 98 having structure substantially identical to members 70, 72, 74, 76 and 84 described above and operating to produce a steering reaction curve for chamber 50 identical to that shown in FIGURE 6 for chamber 52. Recess 66 communicates with chamber 50 through passage 67 to receive fluid under the same pressure as exists in chamber 50. The operation of reaction means 65 is exactly the same as 63 but in the opposite direction to develop a steering reaction pressure acting against movement of thrust member 30 to the right in FIGURES 1, 2 and 3. The only structural difference between these reaction means is the provision in means 65 of a low pressure reaction ring 100 and the enlargement of seal 92 over seal 70. Ring 100 and enlarged seal 92 are required to provide an extra force to move member 30 and shaft 14 to the left in FIGURES 1, 2 and 3, which extra force is necessitated by the loss in effective pressure area of the side of piston 20 communicating with chamber 50 due to the end 92 of shaft 14 being in communication with the fluid in chamber 50.

I claim:
1. A reaction mechanism for use in power steering systems having a steering shaft movably mounted in a power steering housing, said mechanism comprising a pressure source, a keel over member communicating on one side with said source, means operatively connecting said member with said shaft to move said member against said pressure in response to movement of said shaft, means in said housing engageable with said member intermediate its edges to provide a fulcrum therefor when said pressure reaches a certain value.

2. A reaction mechanism for use in power steering systems having a steering shaft movably mounted in a power steering housing, said mechanism comprising reaction means operatively linked with said shaft to be moved thereby, means for applying reaction force to said reaction means to oppose said steering movement, said reaction means having a portion yieldable when subjected to said reaction force, and load carrying means on said housing engageable with said portion to provide a fulcrum therefor intermediate the edges thereof to establish a counter moment and assume a portion of the reaction force applied to said reaction means when said force exceeds a predetermined value.

3. In a power steering system having a source of fluid communicating with a double acting fluid actuated power piston, and a fluid flow regulating valve for regulating the flow of fluid to each side of said piston, a housing, a shaft movably mounted in said housing, valve actuating means carried by said shaft to engage said valve and actuate the same in response to movement of said shaft, a pressure responsive reaction member movably mounted in said housing to abut said actuating means upon movement thereof from a dead center position, said reaction member hydraulically communicating through conduit means with said piston to receive reaction pressure signals therefrom and transmit the same to said actuating means in the form of steering reaction force, and abutment means engageable with said reaction member intermediate its edges at a predetermined pressure on said piston to establish a counter moment and assume a portion of the reaction force developed by said pressure signals in excess of said predetermined pressure.

4. In a power steering system having a source of pressurized fluid connected to a fluid motor which is operatively connected to valve means for regulating the flow of fluid to said motor, a housing, a steering shaft movably mounted in said housing and operatively connected to said motor, valve actuating means operably connecting said shaft and said valve to actuate the latter in response to movement of said shaft, reaction means movably mounted in said housing and engageable with said shaft at certain positions thereof relative to said housing, conduit means connecting said motor and said reaction means to transmit fluid pressure in said motor to said reaction means, said reaction means being yieldable under said motor pressure to transmit the same to said shaft, and load carrying means on said housing arranged to provide a fulcrum for said reaction means intermediate its edges when said pressure exceeds a predetermined value to thereby reduce the proportion of said pressure above said predetermined value transmitted to said valve actuating means.

5. In a power steering system having a pressure responsive motor and valve means for regulating the transmission of pressure to said motor, a housing having an axial bore therein, a rotatable steering shaft mounted in said bore for limited axial movement therein, valve actuating means on said shaft operably connected to said valve means to actuate the latter in response to axial movement of said shaft, annular disc shaped reaction means movably mounted in said housing at each end of said actuating means, conduit means connecting said motor to said reaction means to transmit pressure to the latter proportional to the pressure transmitted to said motor, said reaction means being yieldable under said pressure and having a portion engageable with said valve actuating means to transmit reaction force thereto, and load carrying means on said housing arranged to abut said reaction means intermediate its edges to create a counter moment when said pressure exceeds a predetermined value to thereby reduce the proportion of said pressure transmitted to said valve actuating means.

6. In a power steering system having a double acting fluid actuated power steering piston and a fluid flow regulating valve for regulating the flow of fluid to each side of said piston, a housing, a shaft movably mounted in said housing, valve actuating means carried by said shaft for engaging and actuating said valve in response to movement of said shaft, annular disc shaped reaction members movably mounted in said housing on either side of said actuating means and communicating with opposite sides of said piston to receive pressure signals therefrom and to selectively exert a reaction steering force on said actuating means proportional to said pressure signals upon movement of said actuating means from a dead center position, and abutment means on said housing disposed adjacent each of said reaction members for selectively abutting the same intermediate the edges thereof at a predetermined fluid pressure on said reaction members to create a counter moment and thereby modify the aforesaid force exerted on said actuating means.

7. In a power steering system having a double acting fluid actuated power steering piston and a fluid flow regulating valve for regulating the flow of fluid to each side of said piston, a housing, a rotatably and axially shiftably mounted shaft in said housing, a valve actuating means carried by said shaft for engaging and actuating said valve in response to movement of said shaft, resilient keel over reaction members movably mounted in said housing on either side of said actuating means and having portions engageable with said actuating means, said reaction members communicating with opposite sides of said piston to receive pressure signals therefrom and to selectively exert a reaction steering force on said actuating means proportional to said pressure signals upon movement of said actuating means from a dead center position, and abutment means on said housing disposed adjacent each of said reaction members for selectively abutting the same intermediate the edges thereof at a predetermined fluid pressure on said reaction members to establish a counter moment and thereby modify the aforesaid force exerted on said actuating means.

8. In a power steering system having a double acting fluid actuated power steering piston and a fluid flow regulating sliding valve for regulating the flow of fluid to each side of said piston, a housing, a shaft rotatably and longitudinally movably mounted in said housing and said piston, valve actuating means carried by said shaft and engaging said sliding valve for actuating the same in response to limited longitudinal movement of said shaft, annular reaction members extending around said shaft at opposite sides of said actuating means, each reaction member being longitudinally movable in said housing for transmitting pressure to the adjacent side of said actuating means upon selective longitudinal movement of said actuating means from a dead center position, each of said reaction members communicating through conduit means with a different side of said piston to receive fluid pressure signals therefrom and selectively transmit said pressure to either side of said actuating means, and load carrying means on said housing disposed between each of said reaction members and said actuating means for selectively abutting each of said reaction members intermediate the edges at a predetermined pressure to modify the pressure load on said reaction member.

9. In a power steering system having a source of pressurized fluid selectively connectible to each side of a double acting fluid actuated power steering piston by a fluid flow regulating sliding valve, a steering reaction mechanism comprising a housing, a steering shaft rotatably and longitudinally movably mounted in said housing and threadably received in said piston, valve actuating means on said shaft engageable with said sliding valve for actuating the same in response to slight longitudinal movement of said shaft, annular resilient keel over members encircling said shaft and longitudinally slidably mounted in said housing on opposite sides of said actuating means, annular force transmitting rings movably mounted in said housing and encircling said shaft on each side of said valve actuating means and abutting each said keel over member adjacent the inner periphery thereof, said valve actuating means being selectively engageable with said force transmitting rings upon longitudinal movement of said actuating means from a dead center position, each of said keel over rings communicating through conduit means with a different side of said piston to receive fluid pressure signals therefrom and selectively transmit said pressure to either side of said actuating means through said force transmitting rings, and load carrying means on said housing disposed between each of said keel over rings and said actuating means for selectively abutting each of said keel over rings intermediate the peripheries thereof at a predetermined pressure on each side of said piston to establish a counter moment and assume a portion of the pressure load on said keel over rings and reduce the pressure on said valve actuating means.

10. In a power steering system having a power steering valve for connecting a pressure responsive motor with a pressure source, a valve actuating post pivotally mounted in a body member and operatively connected to said valve for actuating the same, and a steering shaft shiftable in said body member and carrying valve actuating means engageable with said post for pivoting the same, pressure responsive steering reaction means movably mounted in said body member and in communication with said pressure source, said reaction means being cooperable with said shaft to exert a reaction force on said shaft proportional to the pressure of said source to oppose its steering movement, said reaction means comprising an annular keel over ring abutting an annular force transmitting ring member adjacent the inner periphery of said ring, said ring member being engageable and movable by said actuating means to exert a force on said ring adjacent the inner periphery thereof in a direction opposite to the force exerted on said ring by the pressure of said source, and reaction force modifying means engageable with said ring intermediate the edges thereof to modify said reaction force when the pressure of said source exceeds a predetermined value.

11. In a power steering system having a source of pressurized fluid connected to a fluid motor which is operatively connected to valve means for regulating the flow of fluid to said motor, a housing, a steering shaft movably mounted in said housing and operatively connected to said motor, valve actuating means peripherally located on said shaft and operably connecting said shaft and said valve to actuate the latter in response to movement of said shaft, annular reaction pressure diminishing means movably mounted in said housing and encircling said shaft, conduit means connecting said motor and said reaction means to transmit fluid pressure in said motor to said reaction means for developing reaction pressure thereby, said reaction means being yieldable under said pressure, force transmitting means engageable with said reaction means and said valve actuating means to transmit said reaction pressure to said actuating means, annular load carrying means on said housing encircling said shaft and arranged to abut said reaction means intermediate the edges thereof when said reaction pressure exceeds a predetermined value to thereby reduce the proportion of said reaction pressure transmitted to said valve actuating means, slots peripherally located in said load carrying means, and spring means extending through said slots and abutting portions of said force transmitting means to urge said actuating means and said valve means to a neutral steering position.

12. In a power steering system having a power steering valve communicating with a pressure source, a valve actuating post pivotally mounted in a body member and operatively connected to said valve for actuating the same, a steering shaft shiftable in said body member and engageable with said post for pivoting the same, pressure responsive steering reaction means in communication with said pressure source and engageable with said shaft to exert a reaction force on said shaft opposing the steering movement, and reaction force modifying means engageable with said reaction means at a predetermined position thereof to provide a fulcrum therefor and decrease the effective reaction pressure area thereof.

13. In a power steering system having a power steering valve communicating with a pressure source, a steering shaft shiftable in said body member and carrying valve actuating means engageable with said valve for actuating the same, recess means in said body member communicating with said pressure source, cup-shaped sealing means slidably mounted in said recess and frictionally and sealingly engaging the sides thereof, pressure responsive steering reaction means having one surface engageable by said sealing means and an opposite surface engageable by a stationary portion of said body member, said engagement being intermediate the edges of said opposite surface, said reaction means exerting a reaction force on said shaft opposing its steering movement, said stationary portion engaging said opposite surface at a predetermined fluid pressure in said recess to create a countermoment and assume thereby a portion of said reaction force when it exceeds a predetermined value.

14. A reaction mechanism for use in power steering systems having steering shaft means movably mounted in a power steering housing, said mechanism comprising a pressure source, a keel over member communicating on one side with said source, said shaft means being operatively connected to said keel over member to move the same against said pressure as said shaft is moved, and means in said housing engageable with said member intermediate its edges to provide a fulcrum therefor when said pressure reaches a certain value.

References Cited in the file of this patent

UNITED STATES PATENTS

| | | |
|---|---|---|
| 2,063,937 | Kundig | Dec. 15, 1936 |
| 2,682,778 | Creson | July 6, 1954 |
| 2,801,619 | Folkerts | Aug. 6, 1957 |
| 2,827,123 | Lincoln et al. | Mar. 18, 1958 |
| 2,828,721 | Folkerts | Apr. 1, 1958 |